(12) United States Patent
Chuang

(10) Patent No.: US 8,947,434 B2
(45) Date of Patent: *Feb. 3, 2015

(54) PROCESS FOR DETERMINING, SCALING, PROVIDING, COMPARATIVE INFORMATION IN ACCURATE, USEFUL, EASILY RECOGNIZED, AND UNDERSTANDABLE MANNER

(75) Inventor: Chang-Shan Chuang, Taipei (TW)

(73) Assignee: Chii Ying Co. Ltd., Taipei (TW)

( * ) Notice: Subject to any disclaimer, the term of this patent is extended or adjusted under 35 U.S.C. 154(b) by 453 days.

This patent is subject to a terminal disclaimer.

(21) Appl. No.: 12/752,230

(22) Filed: Apr. 1, 2010

(65) Prior Publication Data

US 2010/0188427 A1 Jul. 29, 2010

Related U.S. Application Data

(63) Continuation-in-part of application No. 12/220,604, filed on Jul. 24, 2008, now Pat. No. 8,139,065.

(51) Int. Cl.
*G09G 5/00* (2006.01)
*G06T 11/20* (2006.01)
*G06Q 10/00* (2012.01)
*G06T 11/40* (2006.01)

(52) U.S. Cl.
CPC .............. *G06Q 10/00* (2013.01); *G06T 11/203* (2013.01); *G06T 11/206* (2013.01); *G06T 11/40* (2013.01)
USPC ..................... 345/440; 345/440.1; 345/440.2; 345/441; 345/442; 345/443; 345/660

(58) Field of Classification Search
CPC ...... G06T 11/206; G06T 11/203; G06T 11/40
USPC ........................... 345/440–442; 715/209–215
See application file for complete search history.

(56) References Cited

U.S. PATENT DOCUMENTS 5,485,564 A  1/1996 Miura
5,557,718 A * 9/1996 Tsuneyoshi et al. .......... 345/440
(Continued)

OTHER PUBLICATIONS

Wainer, Howard. Visual revelations: graphical tales of fate and deception from Napoleon Bonaparte to Ross Perot. ISBN 0-387-94902-X. 1997. Copernicus Springer-Verlag New York, Inc. 175 Fifth Avenue New York, NY 10010. pp. 92-94.

(Continued)

*Primary Examiner* — Jin-Cheng Wang
(74) *Attorney, Agent, or Firm* — Ladas & Parry, LLP

(57) ABSTRACT

A machine-implemented process for determining, scaling, providing, and presenting comparative information in an accurate, scaled, useful, easily recognized, and understandable manner, including: reading the data sets; setting first and second boundaries of a first reference axis using first coordinates of data points of one data set having maximum and minimum values, respectively; setting first and second boundaries of each of the other reference axes by adjusting either the first coordinate of one data point of the selected data set having a maximum value or the first coordinate of one data point of the selected data set having a minimum value, wherein every E-value calculated based on the thus-obtained final first and second boundaries of the each of the other reference axes is substantially equal to an E-value of the first data set; and plotting the data points of the data sets. An electronic device capable of presenting a multiple-axis graph is also disclosed.

32 Claims, 10 Drawing Sheets

(56) References Cited

U.S. PATENT DOCUMENTS

| | | | |
|---|---|---|---|
| 6,271,693 B1 | 8/2001 | Shi et al. | |
| 6,477,538 B2 * | 11/2002 | Yaginuma et al. | 1/1 |
| 6,603,477 B1 | 8/2003 | Tittle | |
| 6,920,608 B1 * | 7/2005 | Davis | 715/209 |
| 7,512,875 B2 * | 3/2009 | Davis | 715/215 |
| 8,044,958 B2 * | 10/2011 | Shinohara et al. | 345/440 |
| 2003/0165924 A1 | 9/2003 | Shiffman et al. | |
| 2004/0095350 A1 * | 5/2004 | Kamiyama | 345/441 |
| 2004/0172353 A1 * | 9/2004 | Charnley, Jr. | 705/36 |
| 2005/0099423 A1 * | 5/2005 | Brauss | 345/440 |
| 2005/0248588 A1 * | 11/2005 | Freeman et al. | 345/660 |
| 2006/0028471 A1 * | 2/2006 | Kincaid et al. | 345/440 |
| 2006/0038119 A1 | 2/2006 | Guevremont et al. | |
| 2006/0221078 A1 | 10/2006 | Ishizuka | |
| 2007/0165238 A1 | 7/2007 | Boyd | |
| 2009/0027394 A1 | 1/2009 | Chuang | |
| 2010/0091022 A1 * | 4/2010 | Shinohara et al. | 345/440 |
| 2010/0103177 A1 * | 4/2010 | Shinohara et al. | 345/440 |

OTHER PUBLICATIONS

From U.S. Appl. No. 12/220,604:—Notice of Allowance dated Dec. 9, 2011—Office Actions dated Sep. 19, 2011, Jan. 26, 2011.

* cited by examiner

| Year | 1980 | 1981 | 1982 | 1983 | 1984 | 1985 | 1986 | 1987 | 1988 |
|---|---|---|---|---|---|---|---|---|---|
| Average educational Expenditures (in thousands of US dollars) | 3.51 | 3.52 | 3.66 | 3.8 | 3.9 | 4 | 4.3 | 4.4 | 4.5 |
| Average SAT scores | 845 | 852 | 854 | 845 | 850 | 861 | 880 | 903 | 904 |
| Government Education Budget Difference(%) | 0.88 | 0.9 | 0.87 | 0.85 | 0.85 | 0.83 | 0.79 | 0.77 | 0.75 |

| Date | 2005/6/30 | 2005/9/30 | 2005/12/31 | 2006/3/31 | 2006/6/30 | 2006/9/30 | 2006/12/31 | 2007/3/31 | 2007/6/30 | 2007/9/30 | 2007/12/31 | 2008/3/31 |
|---|---|---|---|---|---|---|---|---|---|---|---|---|
| Earnings before Interest and Taxes (in millions of US dollars) | 600 | 500 | 480 | 300 | 400 | 450 | 420 | 200 | -5 | -350 | -690 | -800 |
| Expense (in millions of US dollars) | 100 | 3000 | 5000 | 9000 | 15000 | 19000 | 20000 | 21800 | 21000 | 21500 | 23000 | 23800 |
| Net income (in millions of US dollars) | -842 | -852 | -853 | -856 | -847 | -848 | -850 | -861 | -880 | -900 | -901 | -904 |
| Revenue (in millions of US dollars) | 36000 | 36750 | 36800 | 37500 | 38750 | 39000 | 39500 | 41000 | 42750 | 43500 | 44000 | 47620 |

| Year | 1990 | 1991 | 1992 | 1993 | 1994 | 1995 | 1996 | 1997 | 1998 | 1999 | 2000 | 2001 | 2002 | 2003 | 2004 | 2005 | 2006 | 2007 | 2008 |
|---|---|---|---|---|---|---|---|---|---|---|---|---|---|---|---|---|---|---|---|
| Export-Import Amount (in millions of US dollars) | -177 | -225 | -500 | -378 | -308 | -200 | -150 | -50 | 0 | 40 | 100 | 300 | 450 | 400 | 200 | 100 | -100 | -105 | -200 |
| Unemployment rate (%) | 1.67 | 1.51 | 1.51 | 1.45 | 1.56 | 1.79 | 2.6 | 2.72 | 2.69 | 2.92 | 2.99 | 4.57 | 5.17 | 4.99 | 4.44 | 4.13 | 3.91 | 3.91 | 3.87 |
| Labor union participation rate (%) | 59.24 | 59.11 | 59.34 | 58.82 | 58.96 | 58.71 | 58.44 | 58.33 | 58.04 | 57.93 | 57.68 | 57.23 | 57.34 | 57.34 | 57.66 | 57.78 | 57.92 | 58.25 | 58.21 |
| GDP Growth Rate (%) | -1.97 | -2.50 | -3.56 | -4.20 | -3.42 | -2.22 | -1.67 | -0.56 | 0.00 | 0.44 | 1.11 | 3.33 | 5.00 | 4.44 | 2.22 | 1.11 | -1.11 | -1.17 | -2.22 |

PROCESS FOR DETERMINING, SCALING, PROVIDING, COMPARATIVE INFORMATION IN ACCURATE, USEFUL, EASILY RECOGNIZED, AND UNDERSTANDABLE MANNER

CROSS-REFERENCE TO RELATED APPLICATION

This is a continuation-in-part application deriving from U.S. patent application Ser. No. 12/220,604.

INTRODUCTION OF THE INVENTION

Invention is an intriguing process. Was the first act of boiling of an egg an act of preservation or an effect allowing travel with food and without illness? Boiling or otherwise cooking of food—illness prevention, health enhancement, or business method for a restaurant?

With electricity, someone noted that, touching and untouching wire ends made a difference; formalizing that and removing significant risk, likely led to what we know as "the switch". Recognition that a switch here can cause something to happen there opened many branches to a still lively tree, beginning with the diminishment of the need for harvest of whales, and diminishment of loss of life and property through accidents involving burning of lighting oils, telegraphy, telephony, early image transmission tiny-dot-by-tiny-dot; image transmission by the whole with facsimile; now of entire volumes by the whole, and continuing well beyond.

This is the patent process at its finest—the encouragement of the useful arts and sciences, the recognition of the creative process, and its laying-open to encourage further thought and creativity . . . sometimes in increments, lately in continuing avalanches. It is the American system; it is what the American forefathers conceived and set forth upon the continent, it is what the American highest law insists be done. It is right and works.

The invention described herein is one of exactly what the patenting system intends to accomplish. This process for determining, scaling, providing, presenting comparative information in an accurate, scaled, useful, easily-recognized, and understandable manner is a solution to long-recognized difficulty: How we may we incorporate and compare multiple, disparate, bits of information, facts, or trends in a coherent manner so as to clarify and have the opportunity to understand—based on reasonable and similarly scaled presentation of available information.

This long-recognized need is based upon experience with and recognition of the misapplication of disparate information either in the belief that it is reasonable or with intent to confuse or deceive by misapplication of the sciences we are beholden to enhance, encourage, and—yes—protect. We present this invention with delight, gratitude, intent, and a deep sense of honor to participate, to support and uphold our moral obligations, as well as receive further encouragement of our contribution of the useful arts and sciences.

BACKGROUND OF THE INVENTION

1. Field of the Invention

The invention relates to a machine-implemented process and an electronic device for presenting a multiple-axis, or multiple-axes, graph for a plurality of data sets, in which adjustments are made, to assure proper scaling, to boundaries of multiple reference axes in a manner allowing for optimal comparison between the data sets.

2. Description of the Related Art

It is often desirable to present a plurality of data sets on a single graph. Microsoft Office EXCEL® may be used for such a purpose. The graph of FIG. 1 is presented using Microsoft Office EXCEL®, and shows average educational expenditures for each child in the United States (in thousands of US dollars), average SAT (Scholastic Aptitude Test) scores in the United States, and Government Education Budget Difference(%), which is hypothetical data from 1980 to 1988. Due to the significant difference in scale among the three data sets, however, no meaningful comparison between unsealed data sets is possible, or even likely, using the graph of FIG. 1.

Other current representative graphing tools are available. However, all of these tools are deficient with respect to the manner in which boundaries of the multiple reference axes are selected. For example, assuming that the multiple reference axes are y-axes, if the boundaries of one of the left y-axes are set to be equal to the maximum and minimum values of one of the data sets, and the boundaries of one of the right y-axes are set to be equal to the maximum and minimum values of one of the other data sets, although the fluctuations in the resulting curves for the multiple data sets are clearly visible, completely erroneous conclusions may be drawn from the resulting graph since such an approach of setting the boundaries of the multiple axes is arbitrary. That is, with such an approach, the boundaries are set for the multiple axes without taking into consideration any relation between the multiple data sets, leading to curves that may suggest correlations between the data sets where there are none or lead to correlations which may be inaccurate, or more likely will be.

SUMMARY OF THE INVENTION

Therefore, an object of this invention is to provide a machine-implemented process, an electronic device for presenting a multiple-axis, or multiple-axes, accurately scaled graph for a plurality of data sets, and a process for presenting a multiple axes, or multiple axes, graph for a plurality of data sets, in which adjustments are made to boundaries of multiple reference axes in a manner allowing for optimal comparison between the data sets.

According to one aspect, the machine-implemented process of this invention for presenting a multiple-axis graph for a plurality of data sets, in which the multiple-axis graph has a plurality of independent and parallel first and other reference axes, and a shared axis intersecting the first and other reference axes, each of the data sets has a plurality of data points, and each of the data points includes a numerical first coordinate and a second coordinate, comprises: a) reading the plurality of the data sets; b) for each of the data sets, calculating an E-value, the E-value being a scaled function of a range of values of the first coordinates of the data points; c) designating the data set with the largest E-value as a first data set, and other data sets with smaller E-values as other data sets, while in the case where the E-values of more than one data set are equal, any one of the data sets is designated as a first data set and other data sets with the same E-value is not necessary to be adjusted through the following steps, and other data sets with smaller E-values are designated as other data sets; d) setting a first boundary of the first reference axis to be equal to the first coordinate of one of the data points of the first data set having a maximum value, and a second boundary of the first reference axis to be equal to the first coordinate of one of the data points of the first data set having a minimum value; e) selecting one of the other data sets, designating it as the second data set, setting one of first and second boundaries of the second reference axis by designating the first coordinate of one of the data points of the second data set having a maximum value or the first coordinate of one of the data points of the second data set having a minimum value as an initial first boundary or an initial second boundary of the second reference axis, respectively, and adjusting the other boundary of the second reference axis to thereby obtain the final first and second boundaries of the second reference axis, wherein an E-value calculated based on the final first and second boundaries of the second axis is substantially equal to the E-value of the first data set, or selecting one of the other data sets, designating it as the second data set, setting first and second boundaries of the second reference axis by designating the first coordinate of one of the data points of the second data set having a maximum value and the first coordinate of one of the data points of the second data set having a minimum value as an initial first boundary and an initial second boundary of the second reference axis, respectively, and adjusting one of the initial first and second boundaries of the second reference axis to thereby obtain the final first and second boundaries of the second reference axis, wherein an E-value calculated based on the final first and second boundaries of the second axis is substantially equal to the E-value of the first data set; and f) executing step e for each of the other reference axes until all other reference axes have the same E-value as the first data set does; g) plotting on a same coordinate plane the data points of the first data set with reference to the first reference axis and the shared axis, and the data points of each of the other data sets with reference to each of the other reference axes and the shared axis.

According to another aspect, an electronic device of this invention capable of presenting a multiple-axis graph for a plurality of data sets, in which the multiple-axis graph has a plurality of independent and parallel first and other reference axes, and a shared axis intersecting the first and other reference axes, each of the data sets has a plurality of data points, and each of the data points includes a numerical first coordinate and a second coordinate, comprises: a user interface for allowing user input of an input instruction associated with the data sets; a reader coupled to the user interface to receive the input instruction, and reading the data sets in accordance with the input instruction; an E-value calculating module coupled to the reader, and which, for each of the data sets, calculates an E-value, the E-value being a scaled function of a range of values of the first coordinates of the data points; a boundary-setting module coupled to the E-value calculating module, the boundary-setting module designating the data set with the largest E-value as the first data set and other data sets with smaller E-values as other data sets, while in the case where the E-values of more than one data set are equal, any one of the data sets is designated as the first data set and other data sets with the same E-value is not necessary to be adjusted through the following steps, and other data sets with smaller E-values are designated as other data sets, setting a first boundary of the first reference axis to be equal to the first coordinate of one of the data points of the first data set having a maximum value, and a second boundary of the first reference axis to be equal to the first coordinate of one of the data points of the first data set having a minimum value, selecting one of the other data sets, designating it as the second data set, setting first and second boundaries of the second reference axis by designating the first coordinate of one of the data points of the second data set having a maximum value and the first coordinate of one of the data points of the second data set having a minimum value as an initial first boundary and an initial second boundary of the second reference axis, respectively, and adjusting one of the initial first boundary and the initial second boundary of the second reference axis to thereby obtain final first and second boundaries of the second reference axis, wherein an E-value calculated based on the final first and second boundaries of the second reference axis is substantially equal to the E-value of the first data set, or selecting one of the other data sets, designating it as the second data set, setting one of first and second boundaries of the second reference axis by designating the first coordinate of one of the data points of the second data set having a maximum value or the first coordinate of one of the data points of the second data set having a minimum value as an initial first boundary or an initial second boundary of the second reference axis, respectively, and adjusting the other boundary of the second reference axis to thereby obtain the final first and second boundaries of the second reference axis, wherein an E-value calculated based on the final first and second boundaries of the second axis is substantially equal to the E-value of the first data set; the boundary-setting module executes this procedure for each of the other reference axes until all other reference axes have the same E-value as the first data set does; and a graph-presenting module coupled to the reader and the boundary-setting module, the graph-presenting module plotting on a same coordinate plane the data points of the first data set with reference to the first reference axis and the shared axis, and the data points of each of the other data sets with reference to each of the other reference axes and the shared axis.

BRIEF DESCRIPTION OF THE DRAWINGS

Other features and advantages of the present invention will become apparent in the following detailed description of the preferred embodiment with reference to the accompanying drawings, of which:

FIG. 12 is yet another presentation of a graph which was created by

Figure 13:
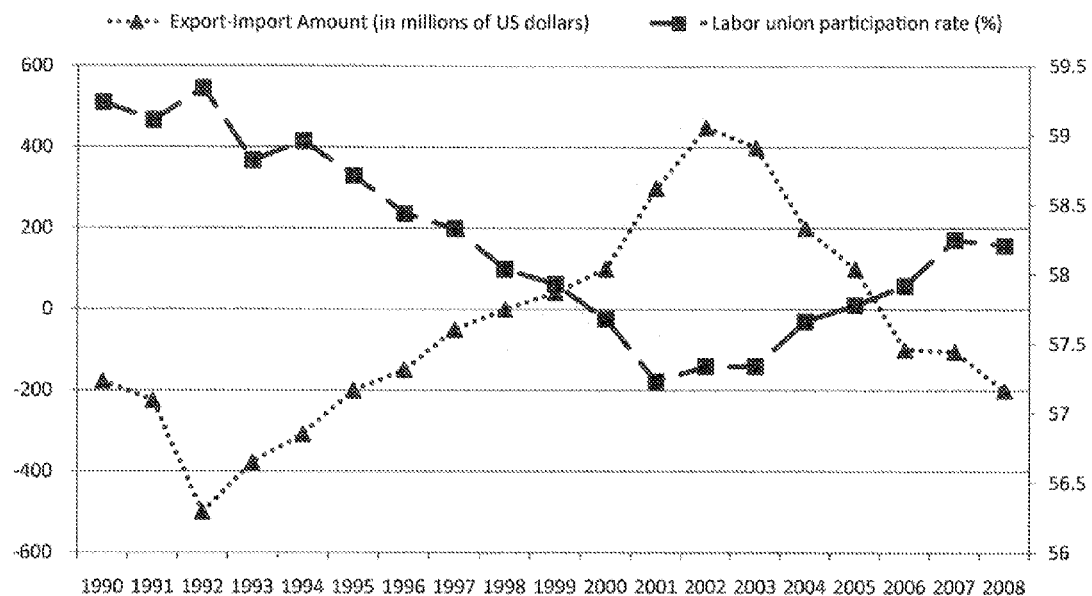
Figure 14:
Figure 15:
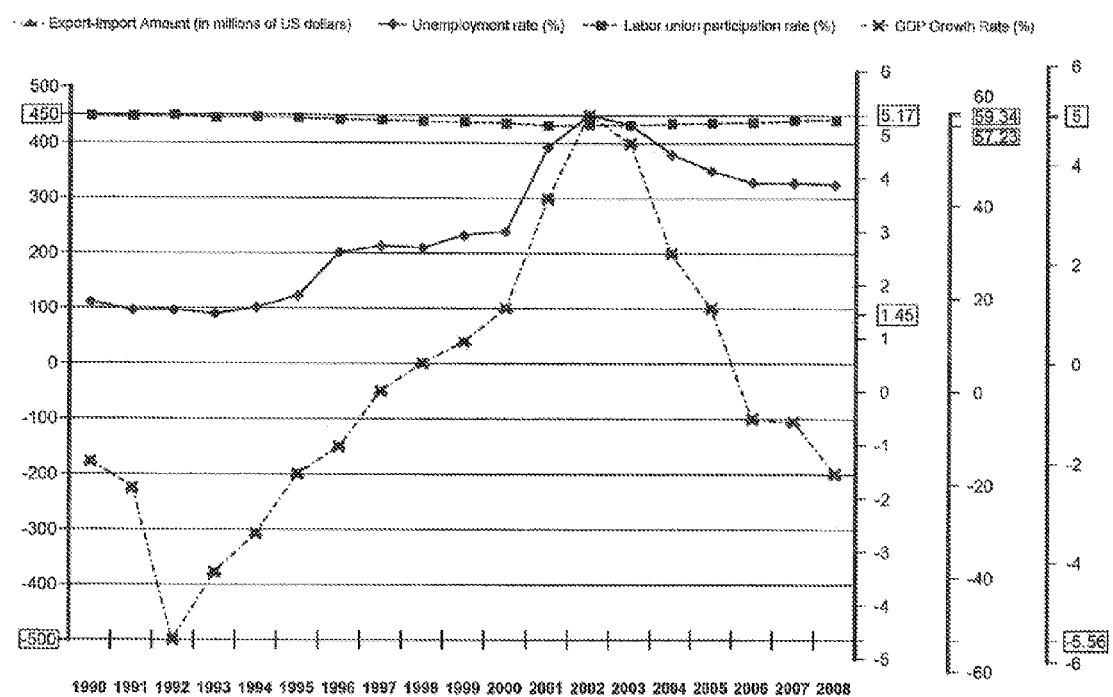

Microsoft Office EXCEL® with two of the data sets in the third table in FIG. 16;

FIG. 13 is yet another presentation of a graph which was created by Microsoft Office EXCEL® with another two of the data sets in the third table in FIG. 16;

FIG. 14 is yet another presentation of a graph which was created by Microsoft Office EXCEL® with another two of the data sets in the third table in FIG. 16;

FIG. 15 is yet another presentation of a graph which was created by the present invention with all four of the data sets in the third table in FIG. 16; and FIG. 16 shows three tables of data points of the data sets used for the graphs of FIGS. 1, 5, 6, 7, 8, 9, 10, 11, 12, 13, 14, and 15.

DETAILED DESCRIPTION; PREFERRED EMBODIMENT

Figure 2:
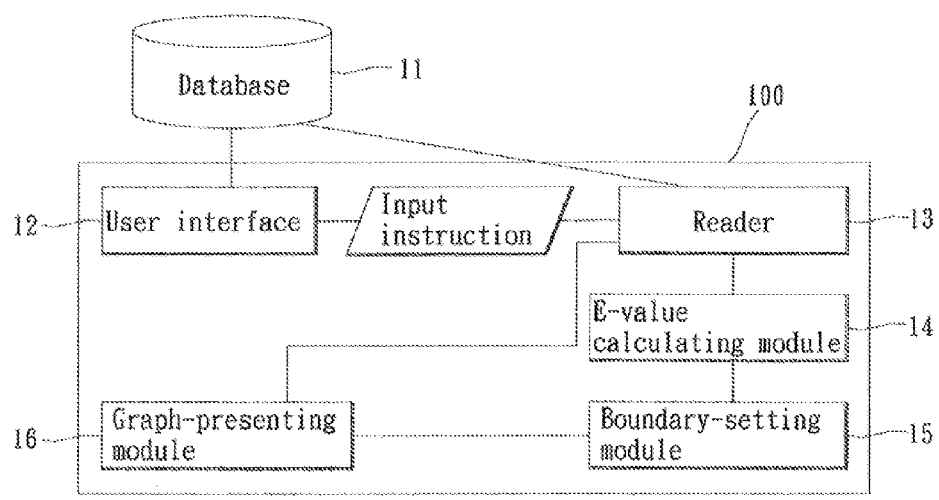
FIG. 2 is a schematic diagram of an electronic device that is capable of presenting a multiple-axis graph for a plurality of data sets according to a preferred embodiment of the present invention.

Referring to FIG. 2, a representation of an electronic device 100, capable of presenting a multiple-axis graph for a plurality of data sets according to a preferred embodiment of the present invention includes a user interface 12, a reader 13 coupled to the user interface 12, an E-value calculating module 14 coupled to the reader 13, a boundary-setting module 15 coupled to the E-value calculating module 14, and a graph-presenting module 16 coupled to the reader 13 and the boundary-setting module 15. The multiple-axis graph has a plurality of independent and parallel first and other reference axes, and a shared axis intersecting the first and other reference axes. By "independent," it is meant that the first and other axes have measurement units and boundaries that are different and unrelated.

Each of the data sets has a plurality of data points, and each of the data points includes a numerical first coordinate and a second coordinate. The electronic device 100 is exemplified as a computer in this embodiment, but may be a personal digital assistant, a smart phone, or any other device capable of handling important aspects, particularly E-value calculation which is represented by reference No. 14 and Boundary-setting calculation which is represented by reference No. 15, and other embodiments of this kind for this invention.

Figure 3:
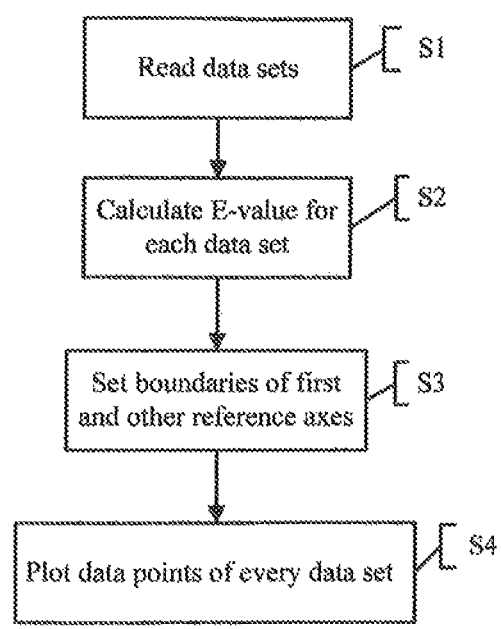
FIG. 3 is a flowchart of a machine-implemented method for presenting a multiple-axis graph for a plurality of data sets according to a preferred embodiment of the present invention.

The electronic device 100 of the present invention performs a method of presenting a multiple-axis graph for a plurality of data sets. A flowchart of a preferred embodiment of the process according to the present invention is shown in FIG. 3.

First, in step S1, the reader 13 reads the data sets in accordance with an input instruction. In one embodiment, the reader 13 is coupled to a database 11 which stores the data sets, the user interface 12 allows user input of the input instruction associated with the data sets, and the input instruction received from the user interface 12 causes the reader 13 to read the data sets in the database 11. In some embodiments, the database 11 may be a part of the electronic device 100, and in such embodiments, the user inputs the data sets into the database 11 through the user interface 12 any time prior to input of the input instruction. In other embodiments, the user inputs the data sets through the user interface 12 as part of the input instruction, and the reader 13 reads the data sets contained in the input instruction after receiving the input instructions.

Next, in step S2, the E-value calculating module 14 calculates an E-value for each of the data sets. For each of the data sets, the E-value is a scaled function of a range of values of the first coordinates of the data points.

In one embodiment, for each of the data sets, the E-value calculating module 14 calculates the E-value by subtracting the first coordinate of said one of the data points of the data set with the minimum value from the first coordinate of said one of the data points of the data set with the maximum value to thereby obtain a difference (i.e., the range of the values of the first coordinates of the data points of the data set), determining which of an absolute value of the first coordinate of said one of the data points of the data set with the minimum value and an absolute value of the first coordinate of said one of the data points of the data set with the maximum value is larger, setting the larger absolute value as a multiplier, and multiplying the difference by an inverse of the multiplier.

In another embodiment, for each of the data sets, the E-value calculating module 14 calculates the E-value by determining which of an absolute value of the first coordinate of said one of the data points of the data set with the minimum value and an absolute value of the first coordinate of said one of the data points of the data set with the maximum value is larger, setting the larger absolute value as a multiplier, and subtracting a product of the first coordinate of said one of the data points of the data set with the minimum value and an inverse of the multiplier from a product of the first coordinate of said one of the data points of the data set with the maximum value and the inverse of the multiplier.

Subsequently, in step S3, the boundary-setting module 15 sets boundaries of the first and other reference axes. In particular, the boundary-setting module 15 first designates the data set with the largest E-value as a first data set, and other data sets with smaller E-values as other data sets. In the case where the E-values of more than one data set are equal, any one of the data sets is designated as a first data set, while other data sets with the same E-value is not necessary to be adjusted through the following boundary-setting module 15, and other data sets with smaller E-values are designated as other data sets. Next, the boundary-setting module 15 sets a first boundary of the first reference axis to be equal to the first coordinate of one of the data points of the first data set having a maximum value, and a second boundary-setting of the first reference axis to be equal to the first coordinate of one of the data points of the first data set having a minimum value. Finally, the boundary-setting module 15 selects one of the other data sets, designates it as the second data set, sets one of first and second boundaries of the second reference axis by designating the first coordinate of one of the data points of the second data set having a maximum value or the first coordinate of one of the data points of the second data set having a minimum value as an initial first boundary or an initial second boundary of the second reference axis, respectively, and adjusts the other boundary of the second reference axis to thereby obtain the final first and second boundaries of the second reference axis, or the boundary-setting module 15 selects one of the other data sets, designates it as the second data set, sets first and second boundaries of the second reference axis by designating the first coordinate of one of the data points of the second data set having a maximum value and the first coordinate of one of the data points of the second data set having a minimum value as an initial first boundary and an initial second boundary of the second reference axis, respectively, and adjusts one of the initial first boundary and the initial second boundary of the second reference axis to thereby obtain final first and second boundaries of the second reference axis. Such adjustment is performed by the boundary-setting module 15 to each of the other reference axes in order that an E-value that is calculated based on the final first and second boundaries of each of the other reference axes is substantially equal to the E-value of the first data set.

Figure 4:
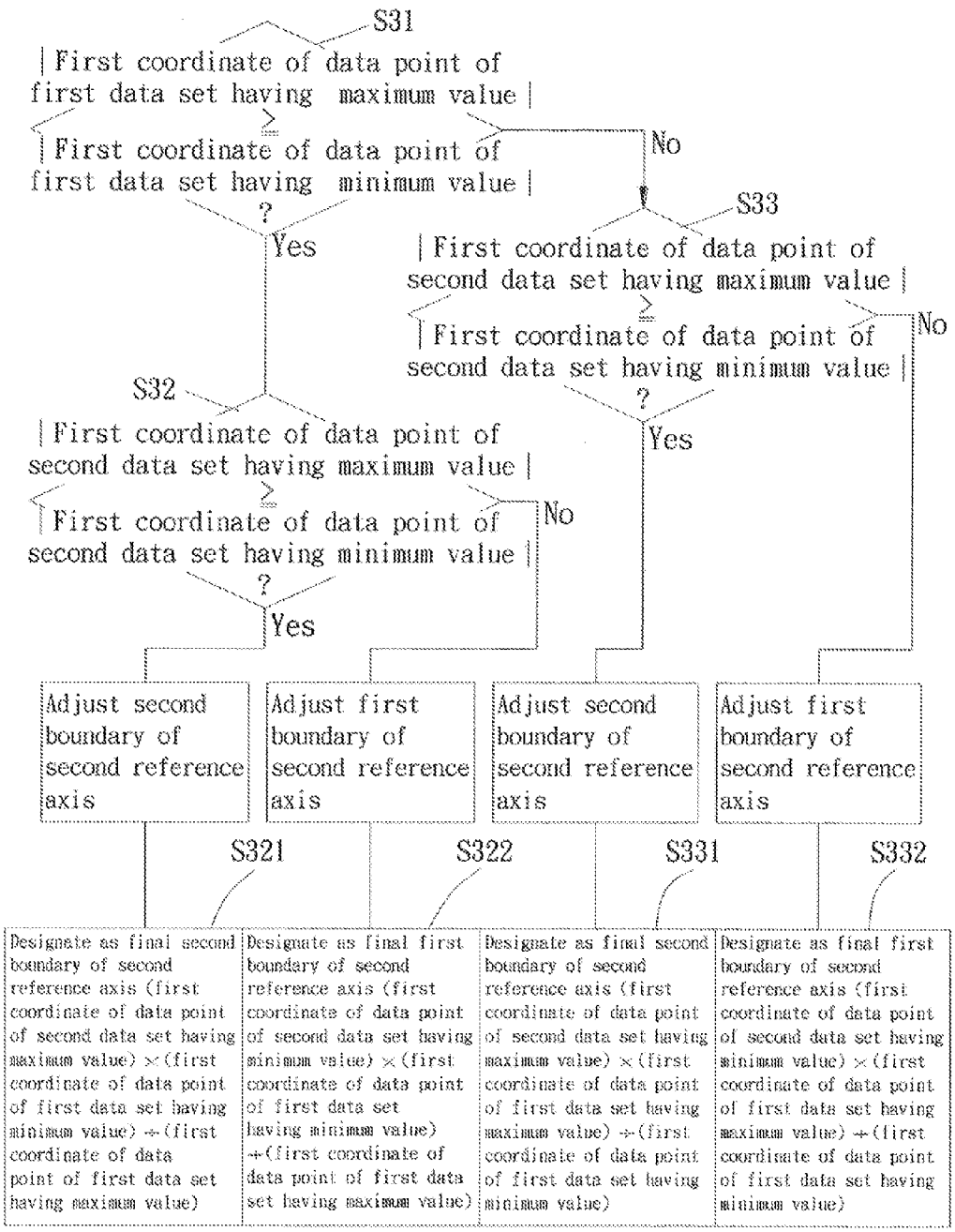
FIG. 4 is a flowchart of sub-steps involved in step S3 of FIG. 3, which is executed to adjust one of the boundaries of the selected data set of the other data sets, referring to the second data set, and which the first step S31 is not needed except for the first time adjustment.

FIG. 4 illustrates the sub-steps involved in obtaining the final first and second boundaries of the second reference axis of step S3, which is executed to adjust one of the boundaries of the selected data set of the other data sets, referring to the second data set.

First, in step S31, it is determined if an absolute value of the first coordinate of said one of the data points of the first data set having the maximum value is greater than or equal to an absolute value of the first coordinate of said one of the data points of the first data set having the minimum value. If so, step S32 is performed. Otherwise, step S33 is performed. However, step S31 only needs to be performed at the first time, since the first data set is the same one for every adjustment.

In step S32, it is determined if an absolute value of the first coordinate of said one of the data points of the selected second data sets having the maximum value is greater than or equal to an absolute value of the first coordinate of said one of the data points of the selected second data set having the minimum value. If so, step S321 is performed. Otherwise, step S322 is performed.

In step S321, the first coordinate of said one of the data points of the second data set having the maximum value is designated as the final first boundary of the second reference axis, and a product of the first coordinate of said one of the data points of the second data set having the maximum value and a ratio value obtained by dividing the first coordinate of said one of the data points of the first data set having the minimum value by the first coordinate of said one of the data points of the first data set having the maximum value is designated as the final second boundary of the second reference axis.

In step S322, the first coordinate of said one of the data points of the second data set having the minimum value is designated as the final second boundary of the second reference axis, and a product of the first coordinate of said one of the data points of the second data set having the minimum value and a ratio value obtained by dividing the first coordinate of said one of the data points of the first data set having the minimum value by the first coordinate of said one of the data points of the first data set having the maximum value is designated as the final first boundary of the second reference axis.

In step S33, it is determined if the absolute value of the first coordinate of said one of the data points of the second data set having the maximum value is greater than or equal to the absolute value of the first coordinate of said one of the data points of the second data set having the minimum value. If so, step S331 is performed. Otherwise, step S332 is performed.

In step S331, the first coordinate of said one of the data points of the second data set having the maximum value is designated as the final first boundary of the second reference axis, and a product of the first coordinate of said one of the data points of the second data set having the maximum value and a ratio value obtained by dividing the first coordinate of said one of the data points of the first data set having the maximum value by the first coordinate of said one of the data points of the first data set having the minimum value is designated as the final second boundary of the second reference axis.

In step S332, the first coordinate of said one of the data points of the second data set having the minimum value is designated as the final second boundary of the second reference axis, and a product of the first coordinate of said one of the data points of the second data set having the minimum value and a ratio value obtained by dividing the first coordinate of said one of the data points of the first data set having the maximum value by the first coordinate of said one of the data points of the first data set having the minimum value is designated as the final first boundary of the second reference axis.

Referring back to FIG. 3, in step S4, the graph-presenting module 16 plots on a same coordinate plane the data points of the first data set with reference to the first reference axis and the shared axis, and the data points of each of the other data sets with reference to each of the other reference axes and the shared axis. This invention also is able to assist in conceptualizing multi-dimensional presentation and graphing of properly scaled information. The graph-presenting module 16 is exemplified as a computer display in this embodiment but may be a computer printer in other embodiments of this invention. Other embodiments may include printer, light board, display board (stock exchange displays), and the like.

In one embodiment, the graph-presenting module 16 plots the data points of at least one of the first and other data sets in a line graph. In another embodiment, the graph-presenting module 16 plots the data points of at least one of the first and other data sets in a bar chart. In such an embodiment where the graph presented by the electronic device 100 of the present invention is a bar chart, the first and second boundaries may be further adjusted by a predetermined amount so that when any first coordinates have small values, they are clearly visible in the resulting bar chart.

Specific examples of presenting a multiple-axis graph using the electronic device 100 of the present invention will now be provided.

Referring first to FIG. 16, Table 1 shown therein lists Average educational Expenditures for each child in the United States (in thousands of US dollars), Average SAT (Scholastic Aptitude Test) scores in the United States, and Government Education Budget Difference (%), which is hypothetical data from 1980 to 1988. When Microsoft Office EXCEL® is used to present a graph of these data sets, the graph of FIG. 1 results. The problems associated with such a graph have been discussed fully hereinabove.

Since Microsoft Office EXCEL® can only present dual axis graphs, in the following examples we will select two of the data sets each time from the multiple data sets to make a dual-axis graph and then compare that graph to the multiple-axis graph of the invention to show the usefulness of the invention.

Figure 5:
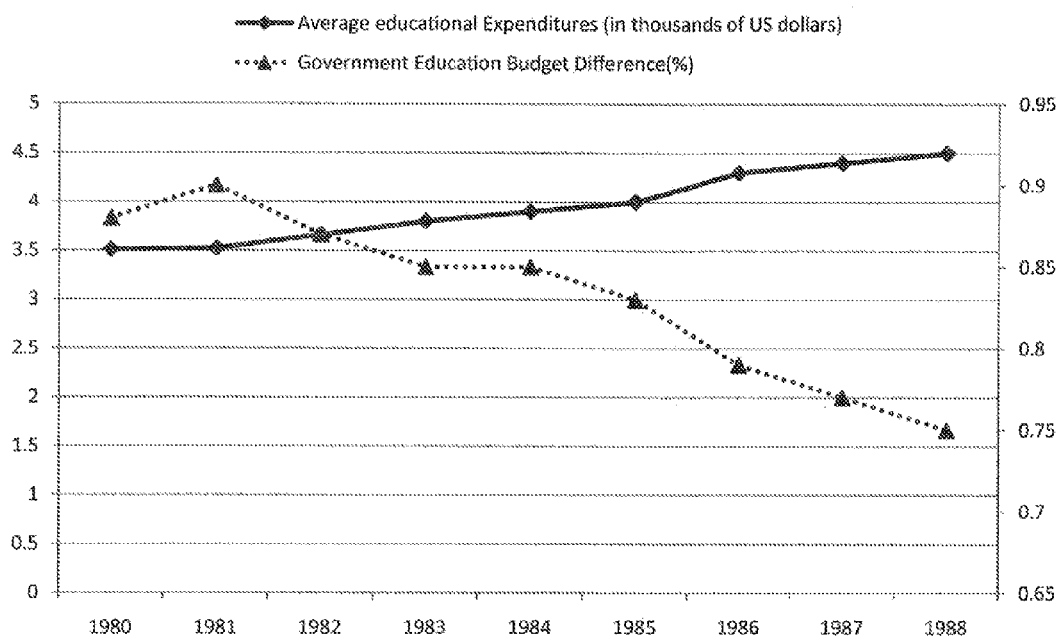
FIG. 5 is a presentation of a graph which was created by Microsoft Office EXCEL® with two of the data sets in the first table in FIG. 16.
Figure 6:
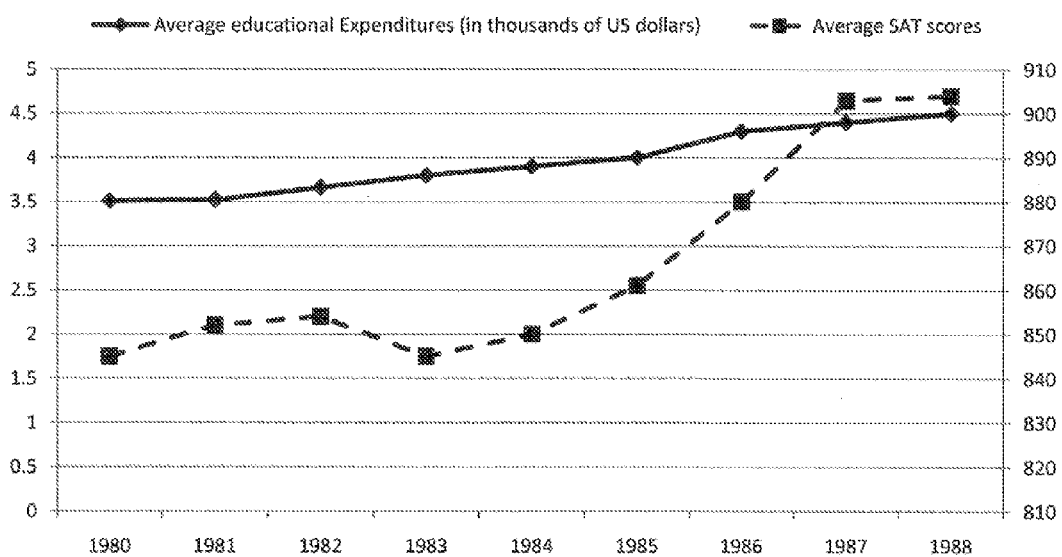
FIG. 6 is a presentation of a graph which was created by Microsoft Office EXCEL® with another two of the data sets in the first table in FIG. 16.

When using the dual-axis chart in Microsoft Office EXCEL® to present these three data by two graphs, which are FIG. 5 and FIG. 6, the FIG. 5 shows that the decrease of Government Education Budget Difference is more than the increase of Average educational Expenditures, and the FIG. 6 shows that the increase of Average SAT scores is a lot more than the increase of Average educational Expenditures.

Figure 7:
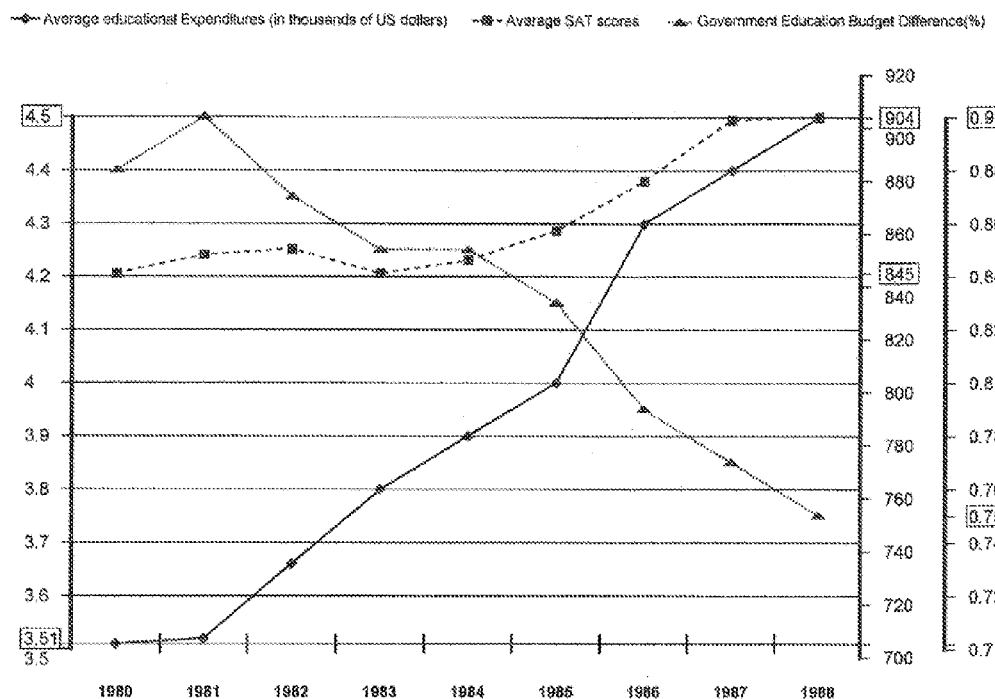
FIG. 7 is a presentation of a graph which was created by the present invention with all the three data sets in the first table in FIG. 16.

However, when the same three data sets are presented in a multiple-axis graph using the electronic device 100 of the present invention, the graph shown in FIG. 7 results. To present the graph, the E-value calculating module 14 first calculates an E-value for each of the data sets. This results in an E-value for Average educational Expenditures of $(4.5-3.51)/4.5 \approx 0.22$, an E-value for Average SAT scores of $(904-845)/904 \approx 0.07$, and an E-value for Government Education Budget Difference of $(0.9-0.75)/0.9 = 0.17$.

Since the E-value for Average educational Expenditures is the highest of the three data sets, the data set of Average educational Expenditures is designated as the first data set, and one of the data sets of Average SAT scores and Government Education Budget Difference can be designated as the second data set first.

Though there is no requirement in the present invention to set the axes in any order, to make the graph more understandable, we set the largest E-value data set as the left y-axis, or the second left y-axis from the left side if there are more than one left y-axis, in the following figures created by the present invention. Hence, the upper and lower (i.e., first and second) boundaries for the left y-axis are set to be equal to the maximum and minimum values, respectively, of Average educational Expenditures. Moreover, if we select Average SAT scores as the second data set first, referring additionally to FIG. 4, since an absolute value of the maximum value (i.e., 4.5) of Average educational Expenditures is greater than an absolute value of the minimum value (i.e. 3.51) of Average educational Expenditures, and since an absolute value of the maximum value (i.e., 904) of Average SAT scores is greater than an absolute value of the minimum value (i.e., 845) of Average SAT scores, the upper (or first) boundary for the right y-axis is set to be equal to the maximum value of the SAT scores, while the lower (or second) boundary for the right y-axis is adjusted using step S321. Namely, the lower boundary for the left y-axis is set to be equal to 904(3.51/4.5)≈705.

We then select Government Education Budget Difference as the second data set, referring additionally to FIG. 4, since we already know that an absolute value of the maximum value (i.e. 4.5) of Average educational Expenditures is greater than an absolute value of the minimum value (i.e., 3.51) of Average educational Expenditures, thus we do not need to execute step S31 again, and since an absolute value of the maximum value (i.e., 0.9) of the Government Education Budget Difference is greater than an absolute value of the minimum value (i.e., 0.75) of the Government Education Budget Difference, the upper (or first) boundary for the right y-axis is set to be equal to the maximum value of the Government Education Budget Difference, while the lower (or second) boundary for the right y-axis is adjusted using step S321. Namely, the lower boundary for the left y-axis is set to be equal to 0.9 (3.51/4.5)≈0.702.

Through such an adjustment, the two E-values calculated based on the upper boundary of each of the two right y-axes and the adjusted lower boundary thereof is substantially equal to the E-value for Average educational Expenditures calculated above. That is, after the adjustment, the E-values calculated based on the upper and lower boundaries of each of the two right y-axes, namely, (904−705)/904=0.22 and (0.9−0.702)/0.9=0.22, are substantially equal to the E-value for Average educational Expenditures as calculated above.

Figure 1:
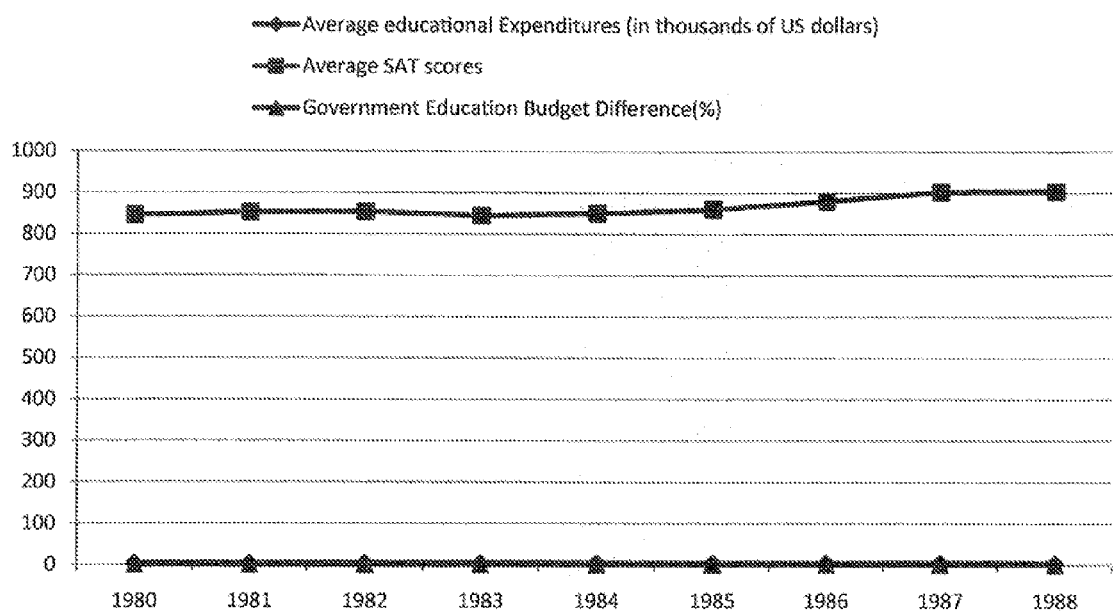
FIG. 1 is a presentation of a graph which was created by Microsoft Office EXCEL® with all of the three data sets in the first table in FIG. 16; two of these data sets are almost overlapped, which is an artifact of the function of the software Microsoft Office EXCEL®.

Comparing the graph of FIG. 7 with the graph of FIG. 1, not only is it possible to clearly view the fluctuations in each of the three data sets in FIG. 7, but since the upper and lower boundaries of the three axes are chosen to result in the same E-value, any correlation that may exist between the three data sets may be accurately inferred from the graph of FIG. 7.

Another example of presenting a multiple-axis graph using the electronic device 100 of the present invention is provided with reference to FIGS. 8, 9, 10, and 11, and Table 2 of FIG. 16. Table 2 of FIG. 16 presents a plurality of data sets for a hypothetical company related to revenue and net income for each quarter and over a particular time period.

Figure 8:
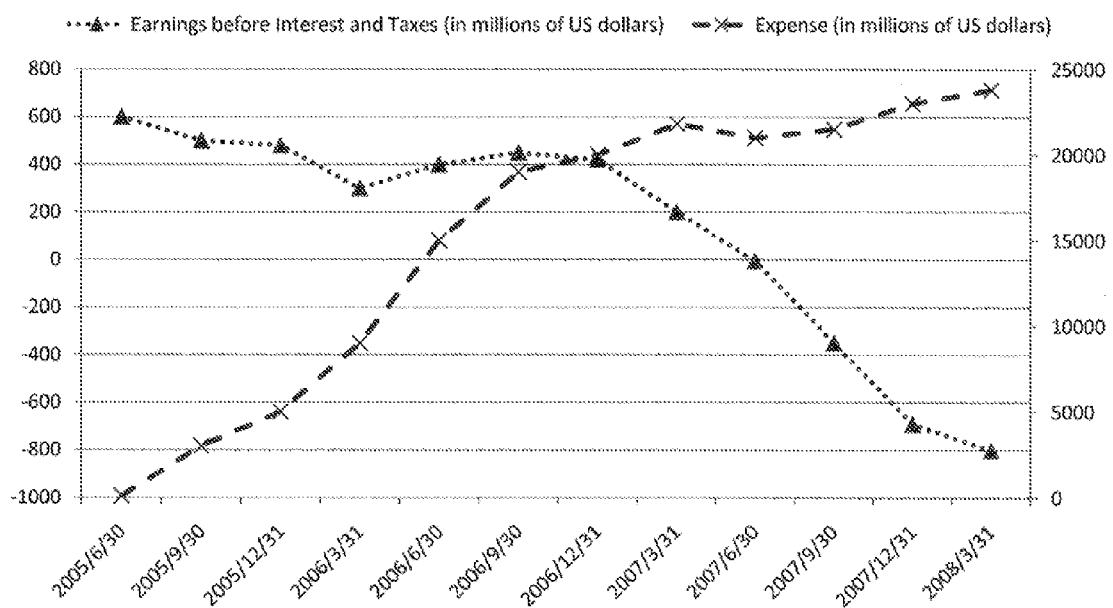
FIG. 8 is another presentation of a graph which was created by Microsoft Office EXCEL® with two of the data sets in the second table in FIG. 16.
Figure 9:
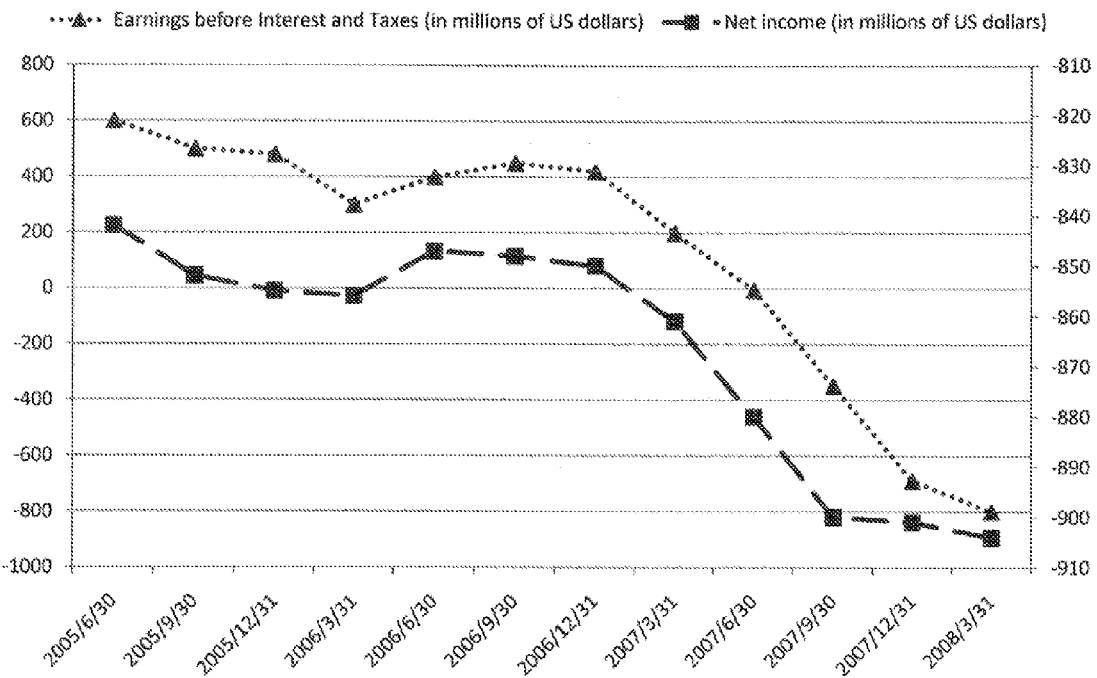
FIG. 9 is another presentation of a graph which was created by Microsoft Office EXCEL® with another two of the data sets in the second table in FIG. 16.
Figure 10:
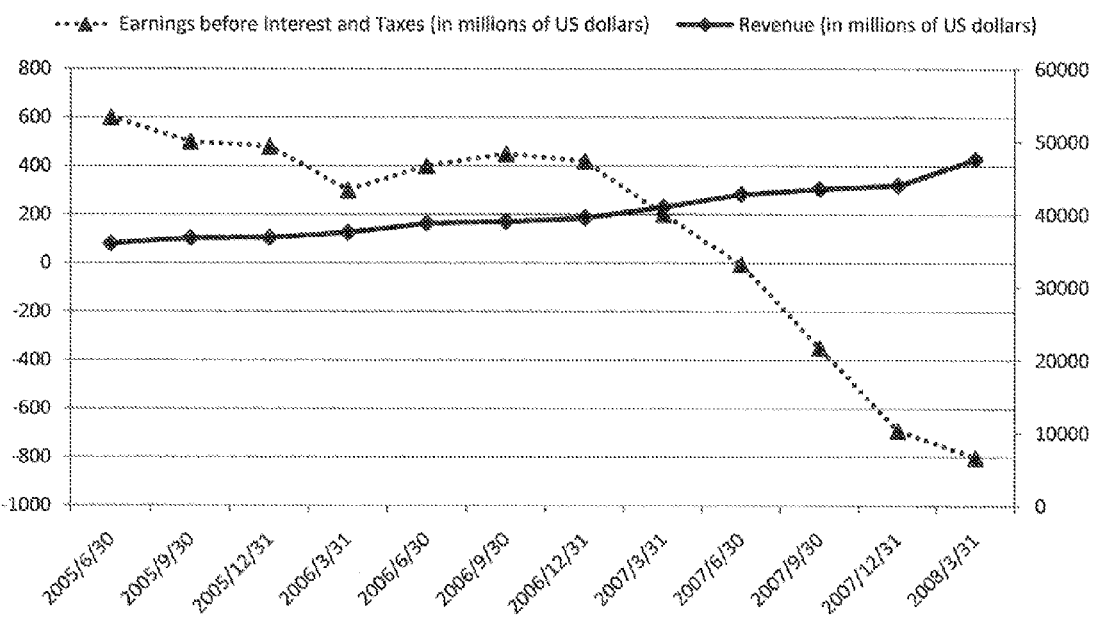
FIG. 10 is another presentation of a graph which was created by Microsoft Office EXCEL® with another two of the data sets in the second table in FIG. 16.

When Microsoft Office EXCEL® is used to present a graph of two of the data sets of Table 2, the graphs of FIGS. 8, 9, and 10 result (or the graphs od FIGS. 8, 9, and 10?). If the same data sets are presented using the electronic device 100 of the present invention, the graph appearing in FIG. 11 results.

Figure 11:
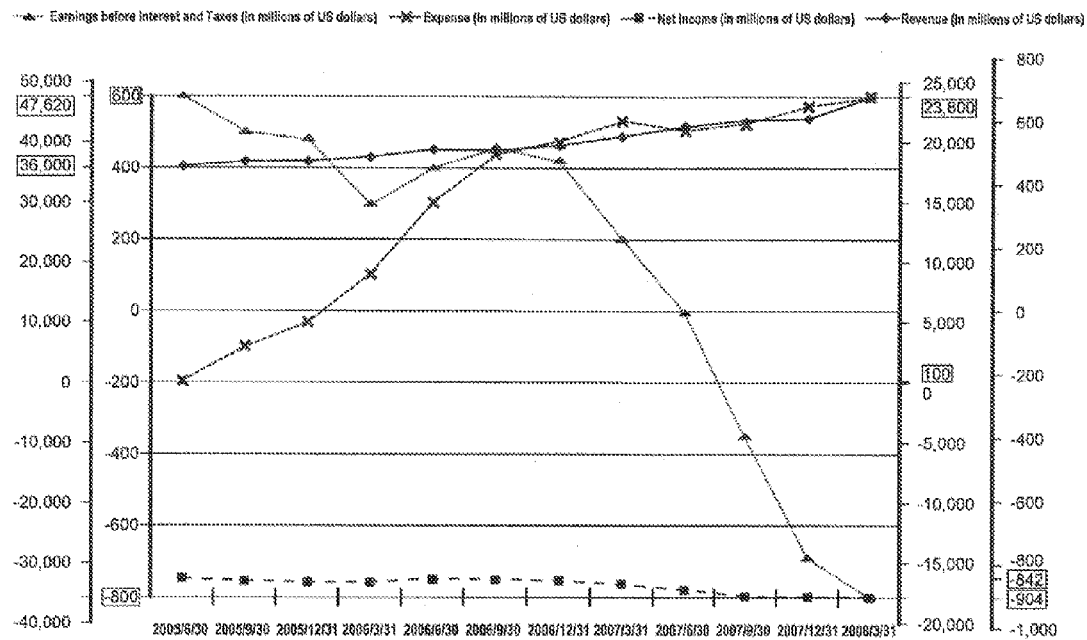
FIG. 11 is another presentation of a graph which was created by the present invention with all the four data sets in the second table in FIG. 16.

In comparing the graphs of FIGS. 8, 9, and 10 with the graph of FIG. 11, the graph of FIG. 11 more accurately depicts details that are not evident from the graphs of FIGS. 8, 9, and 10. For example, from FIG. 8, it seems that the decrease of Earnings before Interest and Taxes is less than the increase of Expense during the period, which may give the reader an understanding that the increase of Expense was the main reason that Earnings before Interest and Taxes decreased. However, FIG. 11 shows that the decrease of Earnings before Interest and Taxes was actually a lot more than the increase of Expense, which may tell the reader that there were other main reasons to cause the Earnings before Interest and Taxes to decrease. In addition, it may seem from FIG. 9 that the data sets of Earnings before Interest and Taxes and Net income have some kinds of connection, which is probably the general understanding of these two accounting items, however, here these two data sets actually have no connection from the fact that Net income does not change much while Earnings before Interest and Taxes has decreased a lot during the period. We can also see that in FIG. 11, Earnings before Interest and Taxes decreased more and Revenue increased less than in FIG. 10. Furthermore, the relationships of these four data sets approximates are more clearly depicted in FIG. 11 than in FIGS. 8, 9, and 10.

Figure 12:
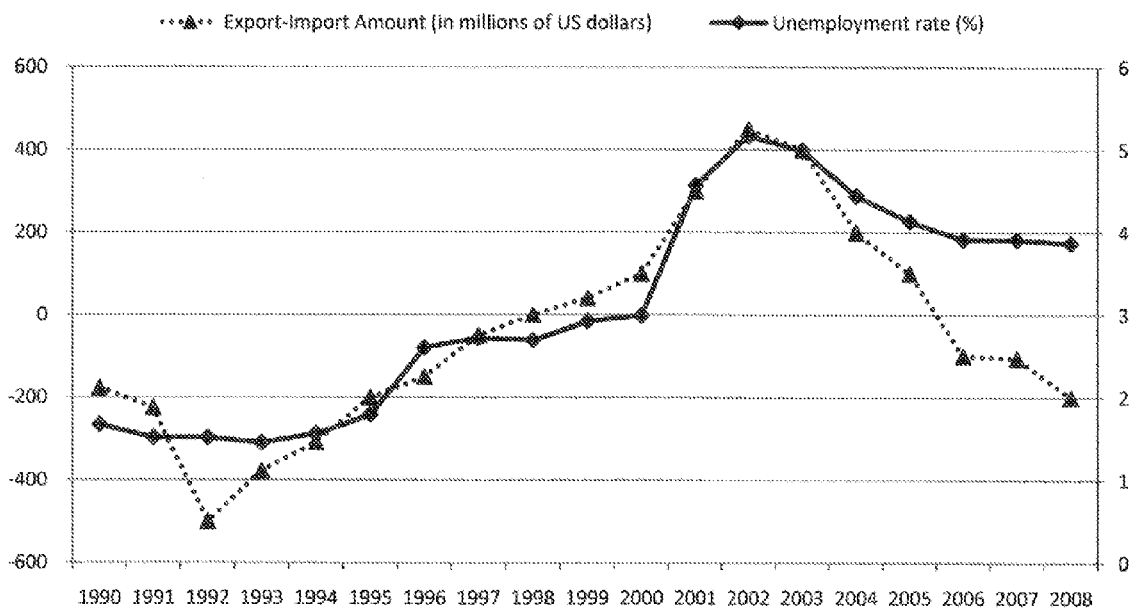

Yet another example of presenting a dual-axis graph using Microsoft Office EXCEL® is provided with reference to FIGS. 12, 13, and 14. If the same data sets are presented using the electronic device 100 of the present multiple-axis graph invention, the FIG. 15 results.

FIGS. 12, 13, and 14 show a graph of Export-Import Amount, Unemployment rate, Labor union participation rate, and GDP growth rate for a hypothetical population over a period from 1990 to 2008 presented using Microsoft Office EXCEL®. FIG. 15 shows a multiple axis graph to FIGS. 12, 13, and 14, but presented using the present invention.

From FIG. 12, one might inaccurately infer that Unemployment rate has the very same variation with Export-Import Amount during 1990~2003, however, from FIG. 15, we can see that Unemployment rate actually had much smaller variation than Export-Import Amount did during 1990~2003. And from FIG. 13, one might say there is an obvious inverse relationship between Export-Import Amount and Labor union participation rate for most of the period in the graph. However, as shown in FIG. 15, after the boundaries for the labor participation rates are adjusted to reflect the range of Export-Import Amount in relative terms, it is evident that no real correlation can be said to exist between the two data sets, i.e., that Labor union participation rate for this particular population are not influenced by Export-Import Amount. In addition, to further show that the present invention can display correct interactions between data sets, we deliberately design a data set that is created by dividing another data set by a fixed number, say dividing the Export-Import Amount data set by 90 to gain the GDP Growth Rate data set. By dividing one data set by a fixed number to create another data set, the two data sets actually have the same ratio, variation, or elongation and should be shown overlapped on a graph. However, by using the prior art, Microsoft Office EXCEL®, in FIG. 14, we can see that these two data sets are not overlapped, while using the present invention, the FIG. 15 shows that the two data sets are overlapped and display the correct interaction between them.

In the examples provided above, the first and second coordinates of each of the data points are an ordinate and an abscissa, respectively, of a Cartesian coordinate system. However, the present invention is not limited in this regard. That is, although the first coordinates are y-coordinates (or ordinates) in the examples above, the present invention is not limited in this respect and in some embodiments, the first coordinates may be x-coordinates. For example, the graph may be presented as a horizontal bar chart, in which case the x-coordinates are the first coordinates.

Additionally, in the examples provided above, the second coordinate of each of the data points is a time coordinate, e.g., years and quarters in Tables 1 and 2 and FIGS. 7 and 11. However, the present invention is not limited in this respect and the second coordinate may be any type of ordinal coordinate (i.e., a coordinate provided in some form of order or succession), or may be names of countries, companies, etc., such as when the dual-axis graph is a bar chart.

While the present invention has been described in connection with what are considered the most practical embodiments, it is understood that this invention is not limited to the disclosed embodiments yet is intended to include various arrangements included within the spirit and scope of the broadest interpretation to encompass all such modifications and equivalent arrangements.

What is claimed is:

1. A machine-implemented process for determining, scaling, providing, and presenting comparative information, comprising:

creating a multiple-axis graph for a plurality of data sets, the multiple-axis graph having a first reference axis, a plurality of second reference axes independent and parallel to the first reference axis, and a shared axis intersecting the first and second reference axes, wherein each of the data sets has a plurality of data points, and each of the data points includes a numerical first coordinate and a second coordinate;

reading the data sets;

calculating an E-value by electronic device for each of the data sets, the E-value being a value calculated from a scaled function with the first coordinate of one of the data points of the data set that has a minimum value and the first coordinate of another one of the data points of the data set that has a maximum value, the E-value indicating a range of values of the first coordinates of the data points of the data set;

designating the data set, whose E-value is the largest among the E-values of the data sets, as a first data set; designating remaining ones of the data sets as second data sets;

setting a first boundary of the first reference axis to be equal to the first coordinate of one of the data points of the first data set having a maximum value, and a second boundary of the first reference axis to be equal to the first coordinate of another one of the data points of the first data set having a minimum value;

setting first and second boundaries of each of the second reference axes by for each of the second data sets, designating the first coordinate of one of the data points having a maximum value and the first coordinate of another one of the data points having a minimum value as an initial first boundary and an initial second boundary of the second reference axis, respectively, and adjusting one of the initial first boundary and the initial second boundary of the second reference axis to thereby obtain a final first boundary and a final second boundary of the second reference axis, so that a final E-value calculated with the final first and final second boundaries of the second reference axis corresponds to the E-value of the first data set; and plotting, in a same coordinate plane, the data points of the first data set with reference to the first reference axis and the shared axis, and the data points of the second data sets with reference to the second reference axes, respectively, and the shared axis.

2. The process of claim 1, wherein, in calculating an E-value by electronic device for each of the data sets, for each of the data sets, the E-value is calculated by subtracting the first coordinate of said one of the data points of the data set with the minimum value from the first coordinate of said one of the data points of the data set with the maximum value to thereby obtain a difference, determining which of an absolute value of the first coordinate of said one of the data points of the data set with the minimum value and an absolute value of the first coordinate of said one of the data points of the data set with the maximum value is larger, setting the larger absolute value as a multiplier, and multiplying the difference by an inverse of the multiplier, or by determining which of an absolute value of the first coordinate of said one of the data points of the data set with the minimum value and an absolute value of the first coordinate of said one of the data points of the data set with the maximum value is larger, setting the larger absolute value as a multiplier, and subtracting a product of the first coordinate of said one of the data points of the data set with the minimum value and an inverse of the multiplier from a product of the first coordinate of said one of the data points of the data set with the maximum value and the inverse of the multiplier.

3. The process of claim 1, wherein said setting one of first and second boundaries of the second reference axis includes one of:

H1) designating the first coordinate of said one of the data points of the second data set having the maximum value as the final first boundary of the second reference axis, and a product of the first coordinate of said one of the data points of the second data set having the maximum value and a ratio value obtained between the first coordinate of said one of the data points of the first data set having the maximum value and the first coordinate of said one of the data points of the first data set having the minimum value as the final second boundary of the second reference axis; and H2) designating the first coordinate of said one of the data points of the second data set having the minimum value as the final second boundary of the second reference axis, and a product of the first coordinate of said one of the data points of the second data set having the minimum value and a ratio value obtained between the first coordinate of said one of the data points of the first data set having the maximum value and the first coordinate of said one of the data points of the first data set having the minimum value as the final first boundary of the second reference axis.

4. The process of claim 3, wherein, when an absolute value of the first coordinate of said one of the data points of the second data set having the maximum value is not less than an absolute value of the first coordinate of said one of the data points of the second data set having the minimum value, step H1) is performed, and when the absolute value of the first coordinate of said one of the data points of the second data set having the maximum value is less than the absolute value of the first coordinate of said one of the data points of the second data set having the minimum value, step H2) is performed.

5. The process of claim 3, wherein, when an absolute value of the first coordinate of said one of the data points of the first data set having the maximum value is not less than an absolute value of the first coordinate of said one of the data points of the first data set having the minimum value, the ratio value is obtained by dividing the first coordinate of said one of the data points of the first data set having the minimum value by the first coordinate of said one of the data points of the first data set having the maximum value, and when the absolute value of the first coordinate of said one of the data points of the first data set having the maximum value is less than the absolute value of the first coordinate of said one of the data points of the first data set having the minimum value, the ratio value is obtained by dividing the first coordinate of said one of the data points of the first data set having the maximum value by the first coordinate of said one of the data points of the first data set having the minimum value.

6. The process of claim 5, wherein, after the process for the first data set is performed, it is not necessary to perform the process again when performing the process for second data sets.

7. The process of claim 3, wherein, the process is performed for each of the second reference axes to assure that all second reference axes have the same E-value as the first data set does.

8. The process of claim 1, wherein, in plotting, in a same coordinate plane, the data points of the first data set with reference to the first reference axis and the shared axis, and the data points of the second data sets with reference to the second reference axes, respectively, and the shared axis, the data points of at least one of the first and second data sets are plotted in a line graph.

9. The process of claim 1, wherein, in plotting, in a same coordinate plane, the data points of the first data set with reference to the first reference axis and the shared axis, and the data points of the second data sets with reference to the second reference axes, respectively, and the shared axis, the data points of at least one of the first and second data sets are plotted in a bar chart.

10. An electronic device capable of creating a multiple-axis graph for a plurality of data sets, the multiple-axis graph having a first reference axis, a plurality of second reference axes independent and parallel to the first reference axis, and a shared axis intersecting the first and second reference axes, each of the data sets having a plurality of data points, each of the data points including a numerical first coordinate and a second coordinate, said electronic device comprising:
a non-transitory computer readable medium for storing the data sets;
a user interface for allowing user input of an input instruction associated with the data sets;
a reader coupled to said user interface to receive the input instruction, and reading the data sets in accordance with the input instruction;
an E-value calculating module coupled to said reader, and which, for each of the data sets, calculates an E-value, the E-value being a value calculated from a scaled function with first coordinate of one of the data points of the data set that has a minimum value and the first coordinate of another one of the data points of the data set that has a maximum value, the E-value indicating a range of values of the first coordinates of the data points of the data set;
a boundary-setting module coupled to said E-value calculating module to set boundaries of each of the first and second reference axes by designating the data set, whose E-value is the largest among the E-values of the data sets, as a first data set, and remaining ones of the data sets as second data sets,
setting a first boundary of the first reference axis to be equal to the first coordinate of one of the data points of the first data set having a maximum value, and a second boundary of the first reference axis to be equal to the first coordinate of another one of the data points of the first data set having a minimum value,
setting first and second boundaries of each of the second reference axis by designating, for each of the second data sets, the first coordinate of one of the data points having a maximum value and the first coordinate of another one of the data points having a minimum value as an initial first boundary and an initial second boundary of the second reference axis, respectively, and by adjusting one of the initial first boundary and the initial second boundary of the second reference axis to thereby obtain a final first boundary and a final second boundary of the second reference axis, so that a final E-value calculated with the final first and final second boundaries of the second reference axis corresponds to the E-value of the first data set; and
a graph-presenting module coupled to said reader and said boundary-setting module, said graph-presenting module plotting on a same coordinate plane the data points of the first data set with reference to the first reference axis and the shared axis, and the data points of the second data sets with reference to the second reference axes and the shared axis.

11. The electronic device of claim 10, wherein said reader is adapted to be coupled to a database that stores the data sets, and the input instruction received from said user interface causes said reader to read the data sets in said database.

12. The electronic device of claim 10, wherein, for each of the data sets, said E-value calculating module calculates the E-value by subtracting the first coordinate of said one of the data points of the data set with the minimum value from the first coordinate of said one of the data points of the data set with the maximum value to thereby obtain a difference, determining which of an absolute value of the first coordinate of said one of the data points of the data set with the minimum value and an absolute value of the first coordinate of said one of the data points of the data set with the maximum value is larger, setting the larger absolute value as a multiplier, and multiplying the difference by an inverse of the multiplier, or by determining which of an absolute value of the first coordinate of said one of the data points of the data set with the minimum value and an absolute value of the first coordinate of said one of the data points of the data set with the maximum value is larger, setting the larger absolute value as a multiplier, and subtracting a product of the first coordinate of said one of the data points of the data set with the minimum value and an inverse of the multiplier from a product of the first coordinate of said one of the data points of the data set with the maximum value and the inverse of the multiplier.

13. The electronic device of claim 10, wherein said boundary-setting module performs one of the following steps:
(i) designating the first coordinate of said one of the data points of the second data set having the maximum value as the final first boundary of the second reference axis, and a product of the first coordinate of said one of the data points of the second data set having the maximum value and a ratio value obtained between the first coordinate of said one of the data points of the first data set having the maximum value and the first coordinate of said one of the data points of the first data set having the minimum value as the final second boundary of the second reference axis; and (ii) designating the first coordinate of said one of the data points of the second data set having the minimum value as the final second boundary of the second reference axis, and a product of the first coordinate of said one of the data points of the second data set having the minimum value and a ratio value obtained between the first coordinate of said one of the data points of the first data set having the maximum value and the first coordinate of said one of the data points of the first data set having the minimum value as the final first boundary of the second reference axis.

14. The electronic device of claim 13, wherein, when an absolute value of the first coordinate of said one of the data points of the second data set having the maximum value is not less than an absolute value of the first coordinate of said one of the data points of the second data set having the minimum value, said boundary-setting module performs step (i), and when the absolute value of the first coordinate of said one of the data points of the second data set having the maximum value is less than the absolute value of the first coordinate of said one of the data points of the second data set having the minimum value, said boundary-setting module performs step (ii).

15. The electronic device of claim 13, wherein, when an absolute value of the first coordinate of said one of the data points of the first data set having the maximum value is not less than an absolute value of the first coordinate of said one of the data points of the first data set having the minimum value, said boundary-setting module obtains the ratio value by dividing the first coordinate of said one of the data points of the first data set having the minimum value by the first coordinate of said one of the data points of the first data set having the maximum value, and when the absolute value of the first coordinate of said one of the data points of the first data set having the maximum value is less than the absolute value of the first coordinate of said one of the data points of the first data set having the minimum value, said boundary-setting module obtains the ratio value by dividing the first coordinate of said one of the data points of the first data set having the maximum value by the first coordinate of said one of the data points of the first data having the minimum value.

16. The electronic device of claim 15, wherein, after the process for the first data set is performed, it is not necessary to perform the process again when performing the adjustment for second data sets.

17. The electronic device of claim 13, wherein, the process is performed for each of the second reference axes to assure that all second reference axes have the same E-value as the first data set does.

18. The electronic device of claim 10, wherein said graph-presenting module plots the data points of at least one of the first and second data sets in a line graph.

19. The electronic device of claim 10, wherein said graph-presenting module plots the data points of at least one of the first and second data sets in a bar chart.

20. A computer program product comprising a non-transitory machine-readable data storage medium including program instructions for causing an electronic device to execute consecutive steps of a machine-implemented process for determining, scaling, providing, and presenting comparative information, said machine-implemented process comprising:

creating a multiple-axis graph for a plurality of data sets, the multiple-axis graph having a first reference axis, a plurality of second reference axes independent and parallel to the first reference axis, and a shared axis intersecting the first and second reference axes, wherein each of the data sets has a plurality of data points, and each of the data points includes a numerical first coordinate and a second coordinate;

reading the data sets;

calculating an E-value by electronic device for each of the data sets, the E-value being a value calculated from a scaled function with the first coordinate of one of the data points of the data set that has a minimum value and the first coordinate of another one of the data points of the data set that has a maximum value, the E-value indicating a range of values of the first coordinates of the data points of the data set;

designating the data set, whose E-value is the largest among the E-values of the data sets, as a first data set;

designating remaining ones of the data sets as second data sets;

setting a first boundary of the first reference axis to be equal to the first coordinate of one of the data points of the first data set having a maximum value, and a second boundary of the first reference axis to be equal to the first coordinate of another one of the data points of the first data set having a minimum value;

setting first and second boundaries of each of the second reference axis by for each of the second data sets, designating the first coordinate of one of the data points having a maximum value and the first coordinate of another one of the data points having a minimum value as an initial first boundary and an initial second boundary of the second reference axis, respectively, and adjusting one of the initial first boundary and the initial second boundary of the second reference axis to thereby obtain a final first boundary and a final second boundary of the second reference axis, so that a final E-value calculated with the final first and final second boundaries of the second reference axis corresponds to the E-value of the first data set; and plotting, on a same coordinate plane, the data points of the first data set with reference to the first reference axis and the shared axis, and the data points of the second data sets with reference to the second reference axes, respectively, and the shared axis.

21. A process for determining, scaling, providing, and presenting comparative information, comprising:

creating a multiple-axis graph for a plurality of data sets, the multiple-axis graph having a first reference axis, a plurality of second reference axes independent and parallel to the first reference axis, and a shared axis intersecting the first and second reference axes, wherein each of the data sets has a plurality of data points, and each of the data points includes a numerical first coordinate and a second coordinate;

reading the data sets;

calculating an E-value by electronic device for each of the data sets, the E-value being a value calculated from a scaled function with the first coordinate of one of the data points of the data set that has a minimum value and the first coordinate of another one of the data points of the data set that has a maximum value, the E-value indicating a range of values of the first coordinates of the data points of the data set;

designating the data set, whose E value is the largest among the E-values of the data sets, as a first data set;

designating remaining ones of the data sets as second data sets;

setting a first boundary of the first reference axis to be equal to the first coordinate of one of the data points of the first data set having a maximum value, and a second boundary of the first reference axis to be equal to the first coordinate of another one of the data points of the first data set having a minimum value;

setting first and second boundaries of each of the second reference axis by for each of the second data sets, designating the first coordinate of one of the data points having a maximum value and the first coordinate of another one of the data points having a minimum value as an initial first boundary and an initial second boundary of the second reference axis, respectively, and adjusting one of the initial first boundary and the initial second boundary of the second reference axis to thereby obtain a final first boundary and a final second boundary of the second reference axis, so that a final E-value calculated with the final first and final second boundaries of the second reference axis corresponds to the E-value of the first data set; and plotting, on a same coordinate plane, the data points of the first data set with reference to the first reference axis and the shared axis, and the data points of the second data sets with reference to the second reference axes, respectively, and the shared axis.

22. The process of claim 21, wherein, in calculating an E-value by electronic device for each of the data sets, for each of the data sets, the E-value is calculated by subtracting the first coordinate of said one of the data points of the data set with the minimum value from the first coordinate of said one of the data points of the data set with the maximum value to thereby obtain a difference, determining which of an absolute value of the first coordinate of said one of the data points of the data set with the minimum value and an absolute value of the first coordinate of said one of the data points of the data set with the maximum value is larger, setting the larger absolute value as a multiplier, and multiplying the difference by an inverse of the multiplier, or by determining which of an absolute value of the first coordinate of said one of the data points of the data set with the minimum value and an absolute value of the first coordinate of said one of the data points of the data set with the maximum value is larger, setting the larger absolute value as a multiplier, and subtracting a product of the first coordinate of said one of the data points of the data set with the minimum value and an inverse of the multiplier from a product of the first coordinate of said one of the data points of the data set with the maximum value and the inverse of the multiplier.

23. The process of claim 21, wherein said setting one of first and second boundaries of the second reference axis includes one of:

H1) designating the first coordinate of said one of the data points of the second data set having the maximum value as the final first boundary of the second reference axis, and a product of the first coordinate of said one of the data points of the second data set having the maximum value and a ratio value obtained between the first coordinate of said one of the data points of the first data set having the maximum value and the first coordinate of said one of the data points of the first data set having the minimum value as the final second boundary of the second reference axis; and H2) designating the first coordinate of said one of the data points of the second data set having the minimum value as the final second boundary of the second reference axis, and a product of the first coordinate of said one of the data points of the second data set having the minimum value and a ratio value obtained between the first coordinate of said one of the data points of the first data set having the maximum value and the first coordinate of said one of the data points of the first data set having the minimum value as the final first boundary of the second reference axis.

24. The process of claim 23, wherein, when an absolute value of the first coordinate of said one of the data points of the second data set having the maximum value is not less than an absolute value of the first coordinate of said one of the data points of the second data set having the minimum value, step H1) is performed, and when the absolute value of the first coordinate of said one of the data points of the second data set having the maximum value is less than the absolute value of the first coordinate of said one of the data points of the second data set having the minimum value, step H2) is performed.

25. The process of claim 23, wherein, when an absolute value of the first coordinate of said one of the data points of the first data set having the maximum value is not less than an absolute value of the first coordinate of said one of the data points of the first data set having the minimum value, the ratio value is obtained by dividing the first coordinate of said one of the data points of the first data set having the minimum value by the first coordinate of said one of the data points of the first data set having the maximum value, and when the absolute value of the first coordinate of said one of the data points of the first data set having the maximum value is less than the absolute value of the first coordinate of said one of the data points of the first data set having the minimum value, the ratio value is obtained by dividing the first coordinate of said one of the data points of the first data set having the maximum value by the first coordinate of said one of the data points of the first data set having the minimum value.

26. A machine-implemented process for determining, scaling, providing, and presenting comparative information, comprising:

creating a multiple-axis graph for a plurality of data sets, the multiple-axis graph having a first reference axis, a plurality of second reference axes independent and parallel to the first reference axis, and a shared axis intersecting the first and second reference axes, wherein each of the data sets has a plurality of data points, and each of the data points includes a numerical first coordinate and a second coordinate;

reading the data sets;

calculating an E-value by electronic device for each of the data sets, the E-value being a value calculated from a scaled function with the first coordinate of one of the data points of the data set that has a minimum value and the first coordinate of another one of the data points of the data set that has a maximum value, the E-value indicating a range of values of the first coordinates of the data points of the data set, the E-value for each of the data sets being calculated by subtracting the first coordinate of said one of the data points of the data set with the minimum value from the first coordinate of said one of the data points of the data set with the maximum value to thereby obtain a difference, determining which of an absolute value of the first coordinate of said one of the data points of the data set with the minimum value and an absolute value of the first coordinate of said one of the data points of the data set with the maximum value is larger, setting the larger absolute value as a multiplier, and multiplying the difference by an inverse of the multiplier, or determining which of an absolute value of the first coordinate of said one of the data points of the data set with the minimum value and an absolute value of the first coordinate of said one of the data points of the data set with the maximum value is larger, setting the larger absolute value as a multiplier, and subtracting a product of the first coordinate of said one of the data points of the data set with the minimum value and an inverse of the multiplier from a product of the first coordinate of said one of the data points of the data set with the maximum value and the inverse of the multiplier;

designating the data set, whose E-value is the lar est amon the E-values of the data sets, as a first data set;

designating remaining ones of the data sets as second data sets;

setting a first boundary of the first reference axis to be equal to the first coordinate of one of the data points of the first data set having a maximum value, and a second boundary of the first reference axis to be equal to the first coordinate of another one of the data points of the first data set having a minimum value;

setting first and second boundaries of each of the second reference axis by for each of the second data sets, designating the first coordinate of one of the data points having a maximum value and the first coordinate of another one of the data points having a minimum value as an initial first boundary and an initial second boundary of the second reference axis, respectively, and adjusting one of the initial first boundary and the initial second boundary of the second reference axis to thereby obtain a final first boundary and a final second boundary of the second reference axis, so that a final E-value calculated with the final first and final second boundaries of the second reference axis corresponds to the E-value of the first data set; and plotting, in a same coordinate plane, the data points of the first data set with reference to the first reference axis and the shared axis, and the data points of the second data sets with reference to the second reference axes, respectively, and the shared axis;

wherein, when an absolute value of the first coordinate of said one of the data points of the second data set having the maximum value is not less than an absolute value of the first coordinate of said one of the data points of the second data set having the minimum value, the first coordinate of said one of the data points of the second data set having the maximum value is designated as the final first boundary of the second reference axis, and a product of the first coordinate of said one of the data points of the second data set having the maximum value and a ratio value obtained between the first coordinate of said one of the data points of the first data set having the maximum value and the first coordinate of said one of the data points of the first data set having the minimum value is designated as the final second boundary of the second reference axis;

wherein, when the absolute value of the first coordinate of said one of the data points of the second data set having the maximum value is less than the absolute value of the first coordinate of said one of the data points of the second data set having the minimum value, the first coordinate of said one of the data points of the second data set having the minimum value is designated as the final second boundary of the second reference axis, and a product of the first coordinate of said one of the data points of the second data set having the minimum value and a ratio value obtained between the first coordinate of said one of the data points of the first data set having the maximum value and the first coordinate of said one of the data points of the first data set having the minimum value is designated as the final first boundary of the second reference axis;

wherein, when an absolute value of the first coordinate of said one of the data points of the first data set having the maximum value is not less than an absolute value of the first coordinate of said one of the data points of the first data set having the minimum value, the ratio value is obtained by dividing the first coordinate of said one of the data points of the first data set having the minimum value by the first coordinate of said one of the data points of the first data set having the maximum value, and when the absolute value of the first coordinate of said one of the data points of the first data set having the maximum value is less than the absolute value of the first coordinate of said one of the data points of the first data set having the minimum value, the ratio value is obtained by dividing the first coordinate of said one of the data points of the first data set having the maximum value by the first coordinate of said one of the data points of the first data set having the minimum value;

wherein, the process is performed for each of the second reference axes to assure that all second reference axes have the same E-value as the first data set does, and, after the process for the first data set is performed, it is not necessary to perform the process again when performing the process for second data sets.

27. The process of claim 26, wherein, in plotting, in a same coordinate plane, the data points of the first data set with reference to the first reference axis and the shared axis, and the data points of the second data sets with reference to the second reference axes, respectively, and the shared axis, the data points of at least one of the first and second data sets are plotted in a line graph.

28. The process of claim 26, wherein, in plotting, in a same coordinate plane, the data points of the first data set with reference to the first reference axis and the shared axis, and the data points of the second data sets with reference to the second reference axes, respectively, and the shared axis, the data points of at least one of the first and second data sets are plotted in a bar chart.

29. An electronic device capable of creating a multiple-axis graph for a plurality of data sets, the multiple-axis graph having a first reference axis, a plurality of second reference axes independent and parallel to the first reference axis, and a shared axis intersecting the first and second reference axes, each of the data sets having a plurality of data points, each of the data points including a numerical first coordinate and a second coordinate, said electronic device comprising:

a non-transitory computer readable medium for storing the data sets;

a user interface for allowing user input of an input instruction associated with the data sets;

a reader coupled to said user interface to receive the input instruction, and reading the data sets in accordance with the input instruction, said reader being adapted to be coupled to a database that stores the data sets and the input instruction received from said user interface causes said reader to read the data sets in said database;

an E-value calculating module coupled to said reader, and which, for each of the data sets, calculates an E-value, the E-value being a value calculated from a scaled function with first coordinate of one of the data points of the data set that has a minimum value and the first coordinate of another one of the data points of the data set that has a maximum value, the E-value indicating a range of values of the first coordinates of the data points the data set, said E-value calculating module calculating the E-value by subtracting the first coordinate of said one of the data points of the data set with the minimum value from the first coordinate of said one of the data points of the data set with the maximum value to thereby obtain a difference, determining which of an absolute value of the first coordinate of said one of the data points of the data set with the minimum value and an absolute value of the first coordinate of said one of the data points of the data set with the maximum value is larger, setting the larger absolute value as a multiplier, and multiplying the difference by an inverse of the multiplier, or determining which of an absolute value of the first coordinate of said one of the data points of the data set with the minimum value and an absolute value of the first coordinate of said one of the data points of the data set with the maximum value is larger, setting the larger absolute value as a multiplier, and subtracting a product of the first coordinate of said one of the data points of the data set with the minimum value and an inverse of the multiplier from a product of the first coordinate of said one of the data points of the data set with the maximum value and the inverse of the multiplier;

a boundary-setting module coupled to said E-value calculating module to set boundaries of each of the first and second reference axes by designating the data set, whose E-value is the largest among the E-values of the data sets, as a first data set, and remaining ones of the data sets as second data sets, setting a first boundary of the first reference axis to be equal to the first coordinate of one of the data points of the first data set having a maximum value, and a second boundary of the first reference axis to be equal to the first coordinate of another one of the data points of the first data set having a minimum value, and setting first and second boundaries of each of the second reference axis by designating, for each of the second data sets, the first coordinate of one of the data points having a maximum value and the first coordinate of another one of the data points having a minimum value as an initial first boundary and an initial second boundary of the second reference axis, respectively, and by adjusting one of the initial first boundary and the initial second boundary of the second reference axis to thereby obtain final first and final second boundaries of the second reference axis, so that a final E-value calculated with the final first and final second boundaries of the second reference axis corresponds to the E-value of the first data set; and a graph-presenting module coupled to said reader and said boundary-setting module, said graph-presenting module plotting on a same coordinate plane the data points of the first data set with reference to the first reference axis and the shared axis, and the data points of the second data sets with reference to the second reference axes and the shared axis;

wherein, when an absolute value of the first coordinate of said one of the data points of the second data set having the maximum value is not less than an absolute value of the first coordinate of said one of the data points of the second data set having the minimum value, the first coordinate of said one of the data points of the second data set having the maximum value is designated as the final first boundary of the second reference axis, and a product of the first coordinate of said one of the data points of the second data set having the maximum value and a ratio value obtained between the first coordinate of said one of the data points of the first data set having the maximum value and the first coordinate of said one of the data points of the first data set having the minimum value is designated as the final second boundary of the second reference axis, wherein, when the absolute value of the first coordinate of said one of the data points of the second data set having the maximum value is less than the absolute value of the first coordinate of said one of the data points of the second data set having the minimum value, the first coordinate of said one of the data points of the second data set having the minimum value is designated as the final second boundary of the second reference axis, and a product of the first coordinate of said one of the data points of the second data set having the minimum value and a ratio value obtained between the first coordinate of said one of the data points of the first data set having the maximum value and the first coordinate of said one of the data points of the first data set having the minimum value is designated as the final first boundary of the second reference axis;

wherein, when an absolute value of the first coordinate of said one of the data points of the first data set having the maximum value is not less than an absolute value of the first coordinate of said one of the data points of the first data set having the minimum value, said boundary-setting module obtains the ratio value by dividing the first coordinate of said one of the data points of the first data set having the minimum value by the first coordinate of said one of the data points of the first data set having the maximum value, and when the absolute value of the first coordinate of said one of the data points of the first data set having the maximum value is less than the absolute value of the first coordinate of said one of the data points of the first data set having the minimum value, said boundary-setting module obtains the ratio value by dividing the first coordinate of said one of the data points of the first data set having the maximum value by the first coordinate of said one of the data points of the first data having the minimum value;

wherein, the process is performed for each of the second reference axes to assure that all second reference axes have the same E-value as the first data set does, and, after the process for the first data set is performed, it is not necessary to perform the process again when performing the adjustment for the second data sets.

30. The electronic device of claim 29, wherein said graph-presenting module plots the data points of at least one of the first and second data sets in a line graph.

31. The electronic device of claim 29, wherein said graph-presenting module plots the data points of at least one of the first and second data sets in a bar chart.

32. A process for determining, scaling, providing, and presenting comparative information, comprising:

creating a multiple-axis graph for a plurality of data sets, the multiple-axis graph having a first reference axis, a plurality of second reference axes independent and parallel to the first reference axis, and a shared axis intersecting the first and second reference axes, wherein each of the data sets has a plurality of data points, and each of the data points includes a numerical first coordinate and a second coordinate;

reading the data sets;
calculating an E-value by electronic device for each of the data sets, the E-value being a value calculated from a scaled function of a range of values of the first coordinates with the first coordinate of one of the data points of the data set that has a minimum value and the first coordinate of another one of the data points of the data set that has a maximum value, the E-value indicatin a range of values of the first coordinates of the data points of the data set, the E-value for each of the data sets being calculated by subtracting the first coordinate of said one of the data points of the data set with the minimum value from the first coordinate of said one of the data points of the data set with the maximum value to thereby obtain a difference, determining which of an absolute value of the first coordinate of said one of the data points of the data set with the minimum value and an absolute value of the first coordinate of said one of the data points of the data set with the maximum value is larger, setting the larger absolute value as a multiplier, and multiplying the difference by an inverse of the multiplier, or determining which of an absolute value of the first coordinate of said one of the data points of the data set with the minimum value and an absolute value of the first coordinate of said one of the data points of the data set with the maximum value is larger, setting the larger absolute value as a multiplier, and subtracting a product of the first coordinate of said one of the data points of the data set with the minimum value and an inverse of the multiplier from a product of the first coordinate of said one of the data points of the data set with the maximum value and the inverse of the multiplier;

designating the data set, whose E-value is the largest among the E-values of the data sets, as a first data set;
designating remaining ones of the data sets as second data sets;
setting a first boundary of the first reference axis to be equal to the first coordinate of one of the data points of the first data set having a maximum value, and a second boundary of the first reference axis to be equal to the first coordinate of another one of the data points of the first data set having a minimum value;
setting first and second boundaries of each of the second reference axis by
for each of the second data sets, designating the first coordinate of one of the data points having a maximum value and the first coordinate of another one of the data points having a minimum value as an initial first boundary and an initial second boundary of the second reference axis, respectively, and
adjusting one of the initial first boundary and the initial second boundary of the second reference axis to thereby obtain a final first boundary and a final second boundary of the second reference axis, so that a final E-value calculated with the final first and final second boundaries of the second reference axis corresponds to the E-value of the first data set; and plotting, on a same coordinate plane, the data points of the first data set with reference to the first reference axis and the shared axis, and the data points of the second data sets with reference to the second reference axes, respectively, and the shared axis;

wherein,
when an absolute value of the first coordinate of said one of the data points of the second data set having the maximum value is not less than an absolute value of the first coordinate of said one of the data points of the second data set having the minimum value, the first coordinate of said one of the data points of the second data set having the maximum value is designated as the final first boundary of the second reference axis, and a product of the first coordinate of said one of the data points of the second data set having the maximum value and a ratio value obtained between the first coordinate of said one of the data points of the first data set having the maximum value and the first coordinate of said one of the data points of the first data set having the minimum value is designated as the final second boundary of the second reference axis;

wherein, when the absolute value of the first coordinate of said one of the data points of the second data set having the maximum value is less than the absolute value of the first coordinate of said one of the data points of the second data set having the minimum value, the first coordinate of said one of the data points of the second data set having the minimum value is designated as the final second boundary of the second reference axis, and a product of the first coordinate of said one of the data points of the second data set having the minimum value and a ratio value obtained between the first coordinate of said one of the data points of the first data set having the maximum value and the first coordinate of said one of the data points of the first data set having the minimum value is designated as the final first boundary of the second reference axis;

wherein, when an absolute value of the first coordinate of said one of the data points of the first data set having the maximum value is not less than an absolute value of the first coordinate of said one of the data points of the first data set having the minimum value, the ratio value is obtained by dividing the first coordinate of said one of the data points of the first data set having the minimum value by the first coordinate of said one of the data points of the first data set having the maximum value, and when the absolute value of the first coordinate of said one of the data points of the first data set having the maximum value is less than the absolute value of the first coordinate of said one of the data points of the first data set having the minimum value, the ratio value is obtained by dividing the first coordinate of said one of the data points of the first data set having the maximum value by the first coordinate of said one of the data points of the first data set having the minimum value.

\* \* \* \* \*